US009428193B2

(12) United States Patent
Pursifull et al.

(10) Patent No.: US 9,428,193 B2
(45) Date of Patent: Aug. 30, 2016

(54) METHOD FOR PREVENTING WHEEL SPIN ON STOPPED VEHICLES

(71) Applicant: Ford Global Technologies, LLC, Dearborn, MI (US)

(72) Inventors: Ross Dykstra Pursifull, Dearborn, MI (US); Ralph Wayne Cunningham, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 43 days.

(21) Appl. No.: 14/284,201

(22) Filed: May 21, 2014

(65) Prior Publication Data
US 2015/0336583 A1    Nov. 26, 2015

(51) Int. Cl.
| B60T 8/176 | (2006.01) |
| B60W 10/184 | (2012.01) |
| B60W 30/18 | (2012.01) |
| B60W 10/06 | (2006.01) |
| B60W 10/11 | (2012.01) |
| B60W 10/18 | (2012.01) |
| B60K 28/16 | (2006.01) |
| B60T 8/17 | (2006.01) |
| B60W 10/04 | (2006.01) |

(Continued)

(52) U.S. Cl.
CPC ........ B60W 30/18172 (2013.01); B60K 28/16 (2013.01); B60T 8/17 (2013.01); B60T 8/175 (2013.01); B60W 10/04 (2013.01); B60W 10/06 (2013.01); B60W 10/10 (2013.01); B60W 10/11 (2013.01); B60W 10/18 (2013.01); B60W 10/182 (2013.01); B60W 10/184 (2013.01); B60W 30/02 (2013.01); B60W 30/18054 (2013.01); B60W 30/18109 (2013.01); *B60T 2230/04* (2013.01); *B60T 2260/04* (2013.01); *B60T 2270/303* (2013.01); *Y10T 477/644* (2015.01); *Y10T 477/688* (2015.01); *Y10T 477/817* (2015.01)

(58) Field of Classification Search
CPC  B60T 8/176; B60W 2520/26; B60W 10/184
See application file for complete search history.

(56) References Cited

U.S. PATENT DOCUMENTS 4,439,832 A * 3/1984 Sato .................. B60T 8/885
303/148
4,484,280 A * 11/1984 Brugger .............. B60T 8/175
180/197

(Continued)

FOREIGN PATENT DOCUMENTS

WO      9600844 A1    1/1996

OTHER PUBLICATIONS

Cunningham, Ralph W. et al., "Method for Increasing Vacuum Production for a Vehicle," U.S. Appl. No. 13/912,942, filed Jun. 7, 2013, 36 pages.

*Primary Examiner* — Tisha Lewis
(74) *Attorney, Agent, or Firm* — Julia Voutyras; Alleman Hall McCoy Russell & Tuttle LLP

(57) ABSTRACT

A method comprising: applying a brake force to all four wheels of a motor vehicle to stop the vehicle while torque continues to be applied to its driven wheels; and preventing wheel slippage of the driven wheels by reducing the applied torque when the vehicle is stopped or nearly stopped from moving in a forward direction. In this way, unintentional lateral movement of the vehicle due to creep torque applied to the driven wheels on slippery surfaces can be prevented or corrected.

16 Claims, 7 Drawing Sheets

(51) Int. Cl.
    *B60W 10/10*    (2012.01)
    *B60W 30/02*    (2012.01)
    *B60T 8/175*    (2006.01)

(56) References Cited

U.S. PATENT DOCUMENTS

| | | | |
|---|---|---|---|
| 4,625,824 A * | 12/1986 | Leiber | B60K 28/16 |
| | | | 180/197 |
| 5,303,794 A * | 4/1994 | Hrovat | B60K 28/165 |
| | | | 180/197 |
| 6,296,592 B1 | 10/2001 | Eguchi et al. | |
| 6,383,116 B1 * | 5/2002 | Warren | B60W 10/02 |
| | | | 477/81 |
| 6,533,081 B2 | 3/2003 | Totsuka et al. | |
| 6,675,758 B2 | 1/2004 | Nagata et al. | |
| 7,152,933 B2 | 12/2006 | Collins et al. | |
| 8,229,642 B2 | 7/2012 | Post, II et al. | |
| 8,285,465 B2 | 10/2012 | Wu et al. | |
| 2007/0216224 A1 | 9/2007 | Schmitt et al. | |
| 2008/0100132 A1 * | 5/2008 | Jeon | B60L 3/10 |
| | | | 303/152 |
| 2013/0090799 A1 * | 4/2013 | Nakamura | B60L 15/20 |
| | | | 701/22 |
| 2015/0224970 A1 * | 8/2015 | Yasui | B60T 8/17616 |
| | | | 701/74 |

\* cited by examiner

METHOD FOR PREVENTING WHEEL SPIN ON STOPPED VEHICLES

FIELD OF THE INVENTION

The present application relates generally to the control of a vehicle, and particularly to a system and method for controlling wheel spin on a stopped vehicle.

BACKGROUND AND SUMMARY

An internal combustion engine in a rear-wheel-drive vehicle with an automatic transmission supplies a torque to the rear wheels at all times when the transmission is in gear. The torque produced when a vehicle is stopped or moving at a very low speed is commonly known as creep torque. This creep torque purposefully causes the vehicle to accelerate when the driver's foot is not on the vehicle's brake pedal. If the driver does not want the vehicle to move, the driver may counter the creep torque with a braking force by pressing the brake pedal.

The inventors herein have recognized that, during cold weather at an initial engine start, the engine idle speed is high, say 1200 rotations per minute. High engine idle speed causes the transmission's torque converter to create a larger than usual creep torque, thereby driving the rear wheels. Furthermore, during these conditions the engine vacuum is low, because the engine is throttled less at the high engine speed and vacuum is consumed by the front end accessory drive, torque converter, catalyst heating, and cold engine friction needs. Thus brake booster vacuum can be low, a consequence further exacerbated by low atmospheric pressure at high altitude.

This combination of conditions may result in slippage of the driven wheels, such as the rear wheels of a rear wheel drive vehicle, if one or more of the rear wheels are on a low friction surface such as ice or snow. Suppose that the vehicle's driver applies enough braking force to stop the front wheels and the vehicle. From the driver's point of view, the driver is doing all that is required. If the rear wheels begin to spin, the tires lose their traction and the rear portion of the vehicle can slide sideways. The driver may either not know to arrest this with greater braking force or may be unable to arrest this with sufficient brake line pressure.

The inventors herein have recognized the above issue and have devised various approaches to address it. In particular, systems and methods for preventing or stopping wheel slippage on a stopped or nearly stopped vehicle are disclosed. In one example, a method, comprises: applying a brake force to all four wheels of a motor vehicle to stop the vehicle while torque continues to be applied to its driven wheels; and preventing wheel slippage of the driven wheels by reducing the applied torque when the vehicle is stopped or nearly stopped from moving in a forward direction. In this way, unintentional lateral movement of the rear portion of a vehicle due to creep torque can be prevented.

In another example, a method, comprises: applying a brake force to all four wheels of a motor vehicle to stop the vehicle while torque continues to be applied to its driven wheels; and in response to wheel slippage of the driven wheels when the vehicle is stopped from moving in a forward direction, reducing the applied torque to reduce the slippage. In this way, unintentional lateral movement of the rear portion of a vehicle due to creep torque can be stopped.

In another example, a system for controlling the driven wheels of a motor vehicle, comprises: a braking system coupled to the driven wheels and non-driven wheels of the vehicle, the braking system responsive to an operator controlled brake; an internal combustion engine coupled to the driven wheels through an automatic transmission; an air intake system including a throttle coupled to an intake of the engine, the throttle responsive to an operator controlled accelerator pedal; the automatic transmission having electrically actuated hydraulic clutches to engage one of a plurality of gears having different gear ratios, each of the gears when engaged coupling engine torque modified by the engaged gear to the driven wheels; and a controller controlling the engine and the transmission, the controller actuating a different one of the selected gears for each one of a range of predetermined speeds of the engine to provide a substantially constant torque applied to the driven wheels over the range of engine speeds when the throttle has been moved to an idle position and the braking system has slowed the vehicle below a predetermined speed or has stopped the vehicle. In this way, unintentional lateral movement of the rear portion of a vehicle due to creep torque may be prevented and stopped and a consistent creep torque may be applied at all times.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
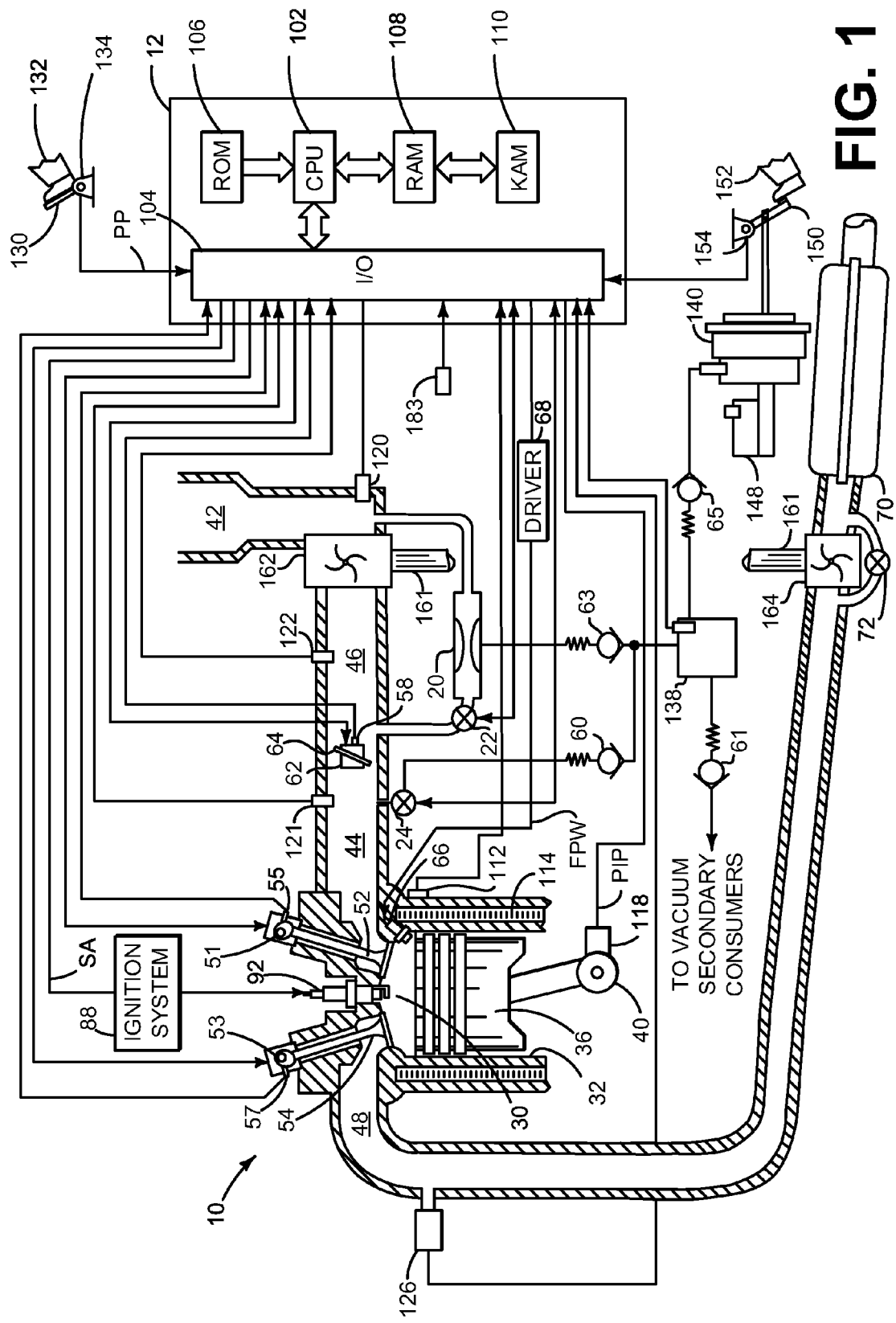
FIG. 1 is a block diagram of a vehicle powertrain.
Figure 2:
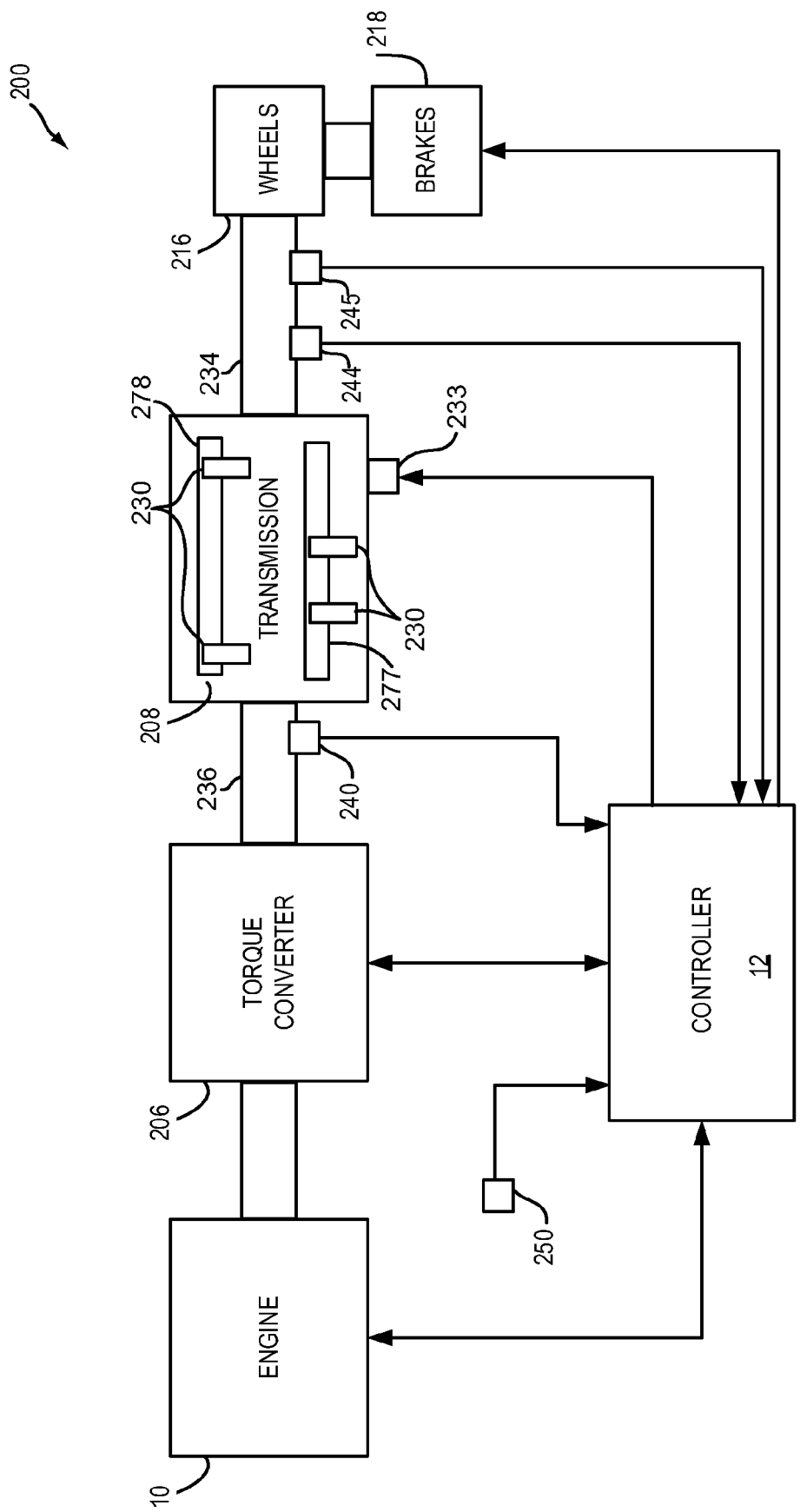
FIG. 2 is an example powertrain system layout.
Figure 3:
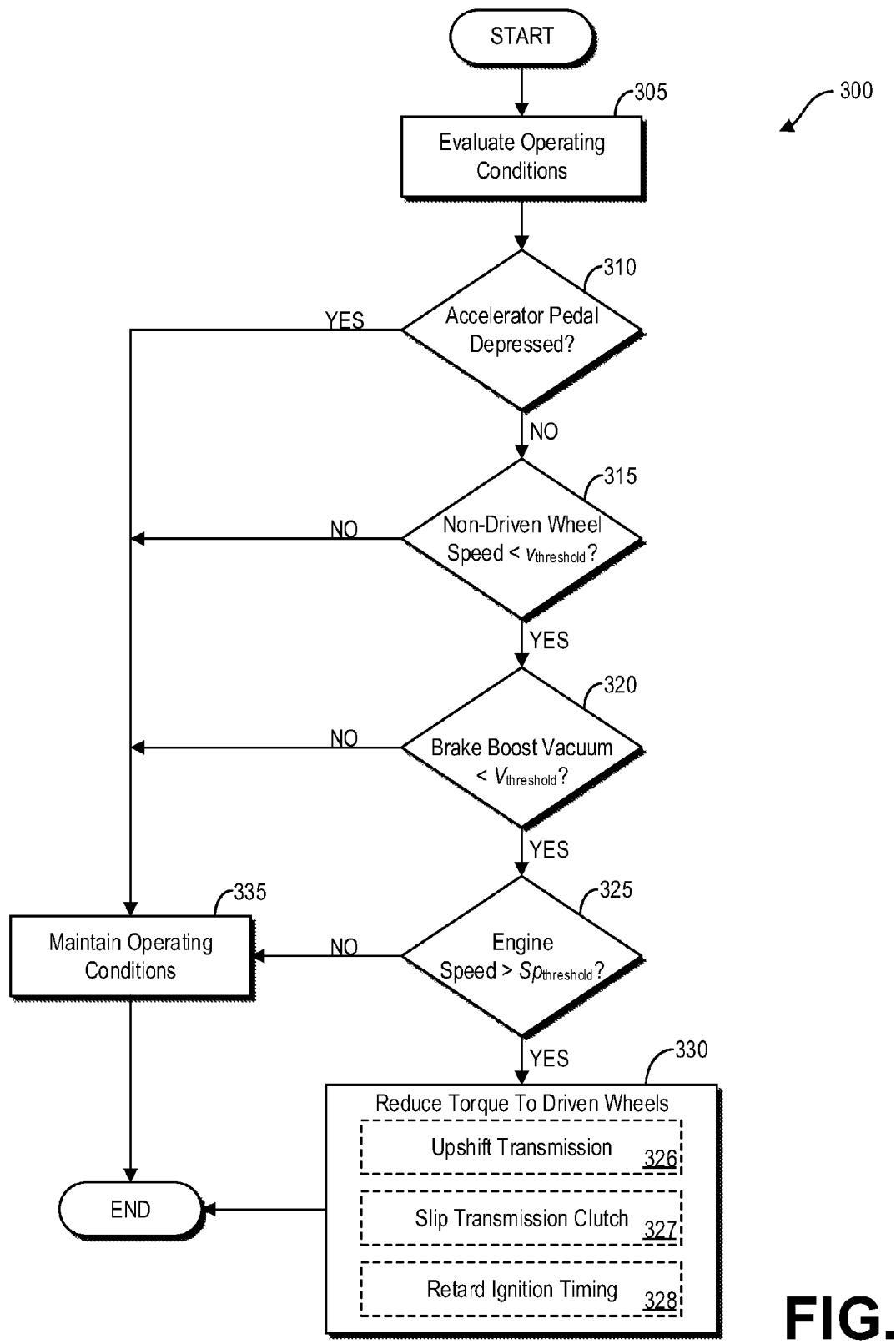
FIG. 3 depicts a flow chart for an example high-level method for preventing wheel slippage on a stopped vehicle.
Figure 4:
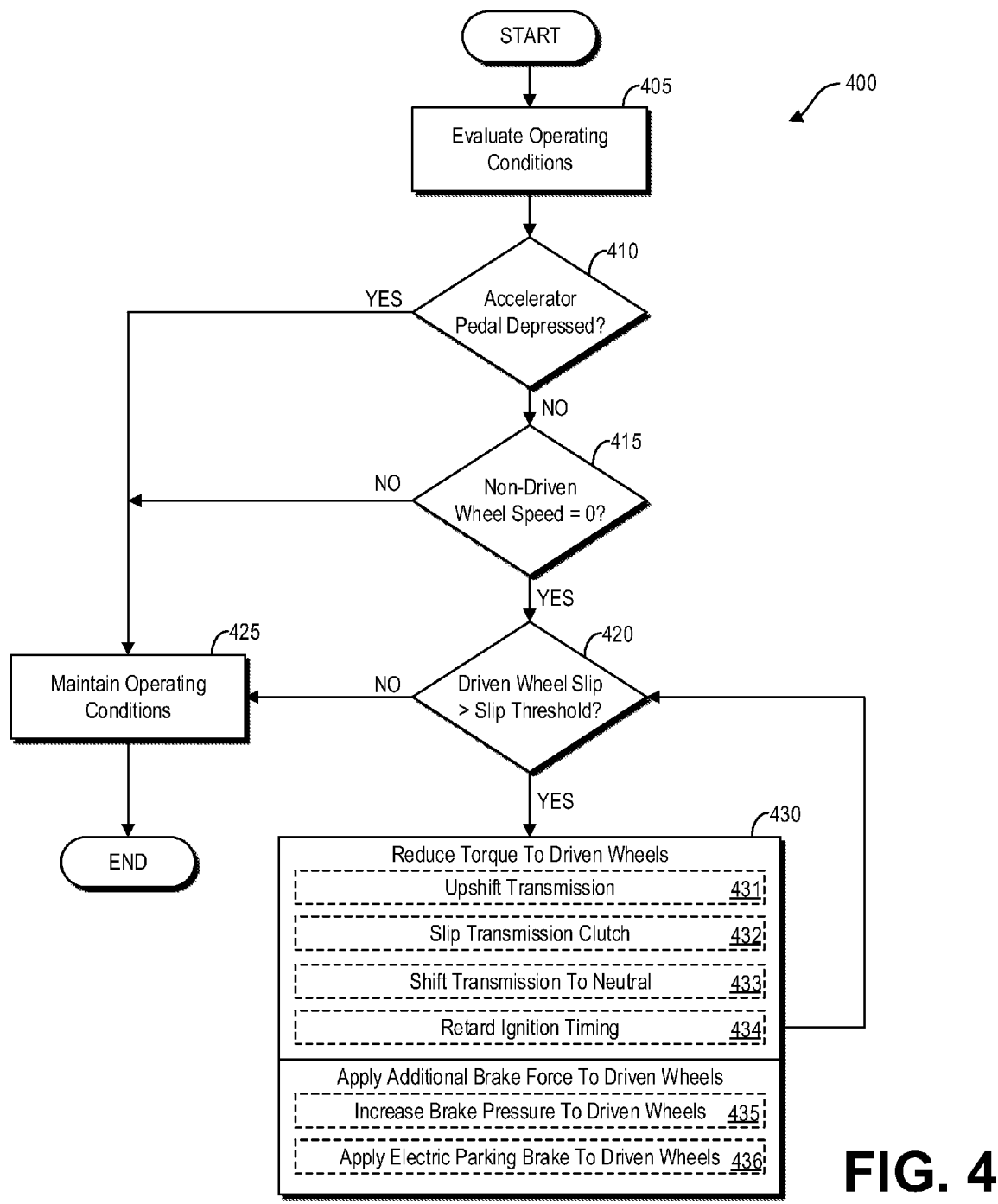
FIG. 4 depicts a flow chart for an example high-level method for stopping wheel slippage on a stopped vehicle.
Figure 5:
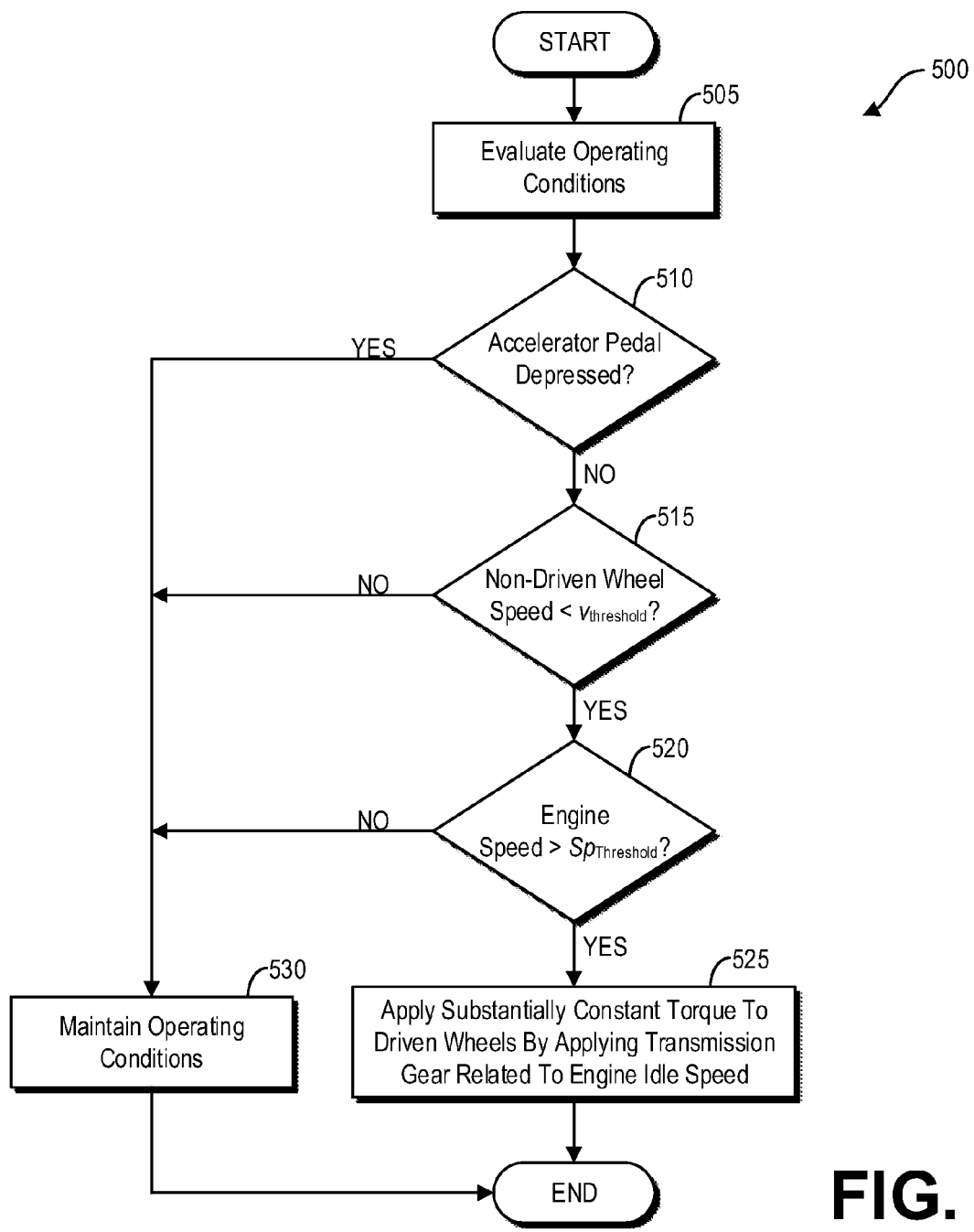
FIG. 5 depicts a flow chart for an example high-level method for stopping wheel slippage on a stopped vehicle.
Figure 6:
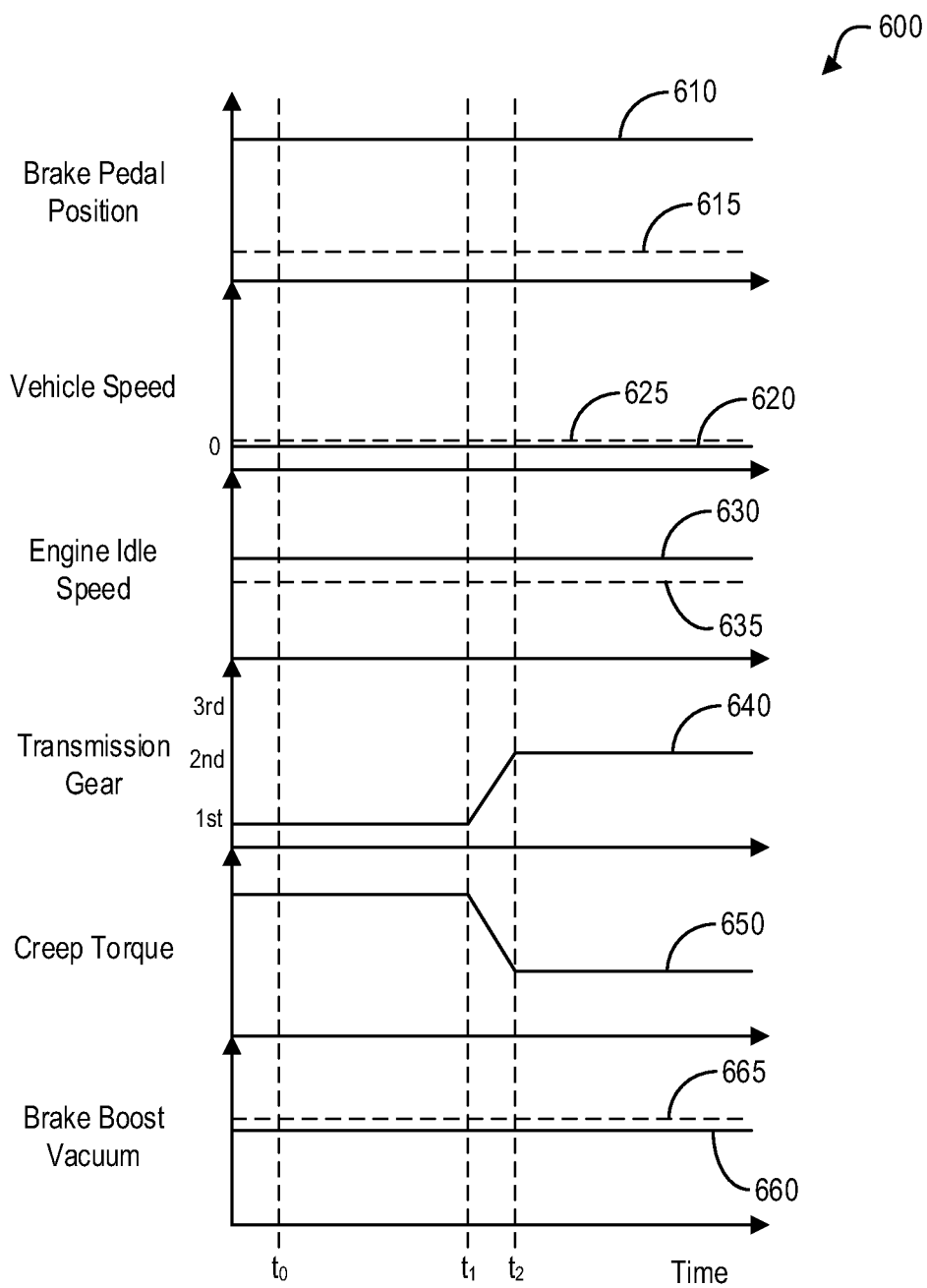
FIG. 6 shows an example timeline for preventing wheel slippage on a stopped vehicle.
Figure 7:
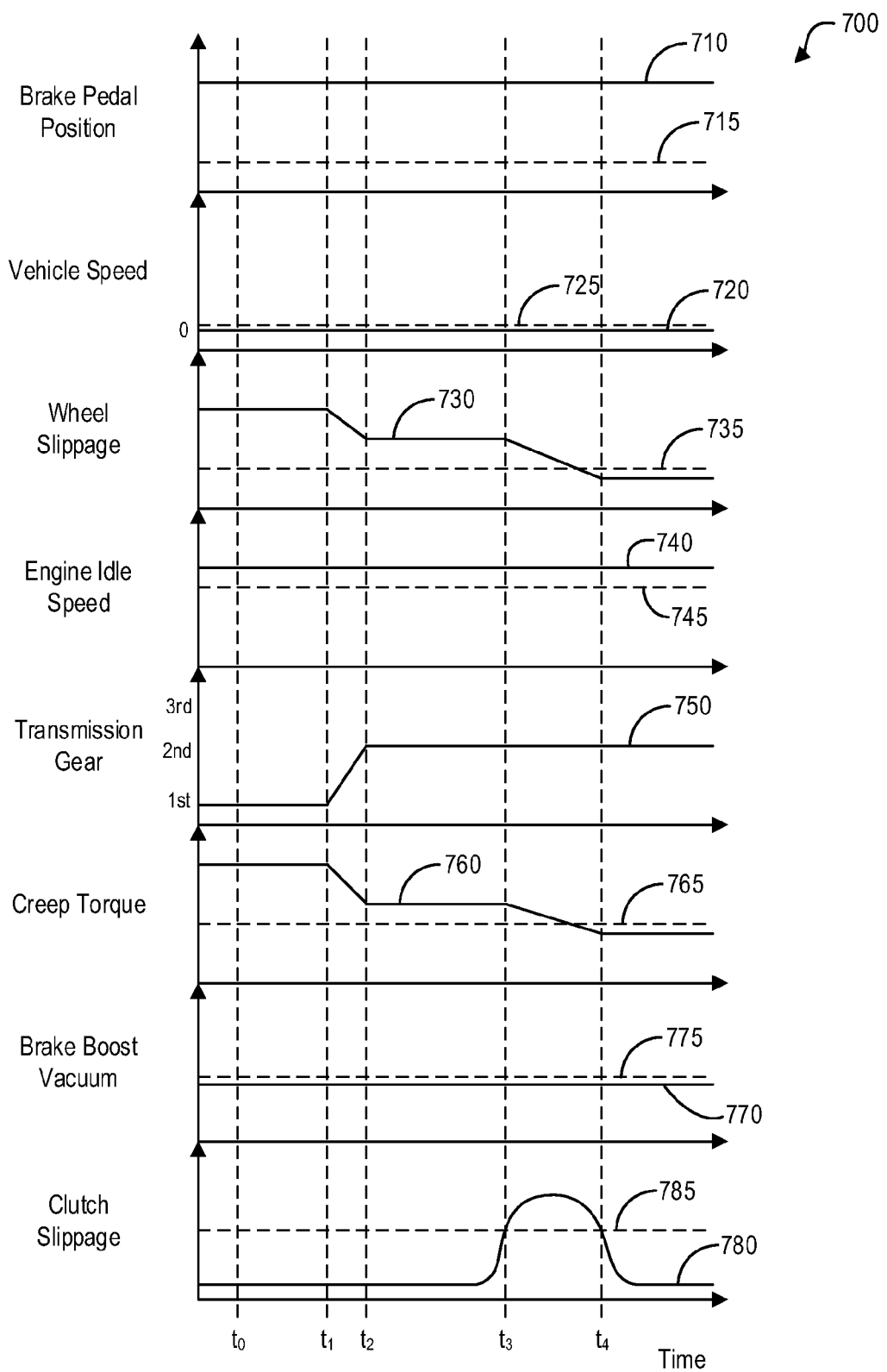
FIG. 7 shows an example timeline for stopping wheel slippage on a stopped vehicle.

The present description is related to preventing wheel slippage for a stopped vehicle. In one example, the engine may be as illustrated in FIG. 1. Further, the engine may be part of a vehicle powertrain as illustrated in FIG. 2. Preventing wheel slippage for a stopped vehicle may be controlled as shown in the sequence of FIG. 3. Stopping wheel slippage for a stopped vehicle may be controlled as shown in the sequence of FIG. 4. Substantially constant torque may be applied to driven wheels as shown in the sequence of FIG. 5. Example timelines for preventing and stopping wheel slippage of a stopped vehicle are shown in FIGS. 6 and 7.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from intake boost chamber 46.

Compressor 162 draws air from air intake 42 to supply boost chamber 46. Exhaust gases spin turbine 164 which is coupled to compressor 162 via shaft 161. Vacuum operated waste gate actuator 72 allows exhaust gases to bypass turbine 164 so that boost pressure can be controlled under varying operating conditions. Vacuum is supplied to waste gate actuator 72 via vacuum reservoir 138. Vacuum reservoir 138 may be supplied vacuum from intake manifold 44 via intake manifold vacuum flow control valve 24 and check valve 60. Optional intake manifold vacuum flow control valve 24 is operated via an electrical signal from controller 12. In some examples, check valve 60 may be omitted.

Vacuum reservoir 138 may also be supplied vacuum via ejector 20. Ejector vacuum flow control valve 22 may be opened to permit compressed air from compressor 162 to pass through ejector 20. Compressed air passes through ejector 20 and creates a low pressure region within ejector 20, thereby providing a vacuum source for vacuum reservoir 138. Air flowing through ejector 20 is returned to the intake system at a location upstream of compressor 162. In an alternative example, air flowing through the ejector 20 may be returned to the air intake system via conduits to the intake manifold at a location downstream of throttle 62 and at a location upstream of compressor 162. In the alternative configuration, valves may be placed between the outlet of ejector 20 and intake manifold 44 as well as between the outlet of ejector 20 and air intake 42. Check valve 63 ensures air does not pass from ejector 20 to vacuum reservoir 138. Air exits ejector 20 and reenters the engine air intake system at a location upstream of compressor 162.

While ejector 20 is useful for increasing intake manifold vacuum and increasing vacuum level, it may not have capacity to provide as much vacuum as is desired in a short amount of time. Further, the performance of ejector 20 may be reduced during times when accelerator pedal 130 is not depressed or when engine torque demand is low since vacuum provided by ejector 20 increases as air flow through ejector 20 increases. Consequently, it may be desirable to increase intake manifold vacuum via a plurality of control actions including reducing and/or eliminating creep torque while providing vacuum via ejector 20. In this way, ejector 20 may provide even deeper vacuum to the vehicle vacuum system.

Vacuum reservoir 138 provides vacuum to brake booster 140 via check valve 65. Vacuum reservoir 138 may also provide vacuum to other vacuum consumers such as turbocharger waste gate actuators, heating and ventilation actuators, driveline actuators (e.g., four wheel drive actuators), fuel vapor purging systems, engine crankcase ventilation, and fuel system leak testing systems. Check valve 61 limits air flow from vacuum reservoir 138 to secondary vacuum consumers (e.g., vacuum consumers other than the vehicle braking system). Brake booster 140 may include an internal vacuum reservoir, and it may amplify force provided by foot 152 via brake pedal 150 to master cylinder 148 for applying vehicle brakes (not shown).

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a position sensor 154 coupled to brake pedal 150 for sensing brake pedal position; a knock sensor for determining ignition of end gases (not shown); a measurement of engine manifold pressure (MAP) from pressure sensor 121 coupled to intake manifold 44; a measurement of boost pressure from pressure sensor 122 coupled to boost chamber 46; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed via sensor 183 for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above described is merely an example, and that intake and exhaust valve opening and/or closing timings may vary, such as to provide positive or negative valve overlap, late intake valve closing, or various other examples.

FIG. 2 is a block diagram of a vehicle powertrain 200. Powertrain 200 may be powered by engine 10. Engine 10 may be started with an engine starting system. Further, the output torque of engine 10 may be controlled by controller 12 through control of throttle 58, the fuel injectors, control of the ignition timing of ignition system 88, and timing of intake valves 52. Torque is further controlled at the driven wheels not only by controlling the output engine torque, but also by controlling torque transmitted through the transmission via controlling slippage of clutch 206 or selecting the transmission gear.

An engine output torque may be transmitted to torque converter 206 to drive automatic transmission 208 via transmission input shaft 236. Torque converter 206 includes an impeller rotor fixed to the output shaft of engine 10 and a turbine rotor fixed to the input shaft 236 of transmission 208. The turbine of torque converter 206 can be driven hydro-dynamically by the impeller of torque converter 206. Thus, torque converter 206 may provide a "hydraulic coupling" between output shaft of engine 10 and input shaft 236 of transmission 208. Torque converter 206 further includes a torque converter clutch (e.g., a bypass clutch). The torque converter clutch is controllable across a range between an engaged position (e.g., a lock-up position, an applied position, etc.) and a disengaged position (e.g., an unlocked position, etc.). In the engaged position, the converter clutch mechanically connects the impeller and the turbine of torque converter 206 thereby substantially discounting the hydraulic coupling between these components. In the disengaged position, the converter clutch permits the hydraulic coupling between the impeller and the turbine of torque converter 206. When the torque converter clutch is disengaged, the hydraulic coupling between the impeller and the turbine of torque converter 206 absorbs and attenuates unacceptable vibrations and other disturbances in the powertrain.

The torque converter clutch may be controlled through the operation of a clutch valve. In response to a control signal, clutch valve pressurizes and vents the converter clutch to engage and disengage. The operation of torque converter 206 can be controlled such that converter clutch is neither fully engaged nor fully disengaged and instead is modulated to produce a magnitude of slip in torque converter 206. The slip of torque converter 206 corresponds to the difference in the speeds of the impeller and the turbine of torque converter 206. The slip of torque converter 206 approaches zero as converter clutch approaches the fully engaged position. Conversely, the magnitude of the slip of torque converter 206 becomes larger as the converter clutch moves toward the disengaged position. When operated to produce a variable magnitude of slip, torque converter 206 can be used to absorb vibrations by increasing the slip, thus causing a greater portion of the engine torque to be passed from the impeller to the turbine of torque converter 206 through hydro-dynamic action.

Torque output from the automatic transmission 208 may be in turn relayed to wheels 216 to propel the vehicle via transmission output shaft 234. Specifically, automatic transmission 208 may transfer an input driving torque at the input shaft 236 responsive to a vehicle traveling conditions before transmitting an output driving torque to the wheels.

If the automatic transmission stops producing a creep torque, it may be advantageous for the brake system to provide a torque that opposes vehicle reverse motion if the transmission is in a forward gear and opposes vehicle forward motion if the transmission is in a reverse gear. The brake system may increase brake system pressure during such conditions. Effectively, the vehicle brakes may function as a directional ratchet mechanism. It may do this in a number of ways, but one method is to arrange the transmission or wheel brakes to be self-actuating such that the intended motion is opposed with far less torque than is the unintended motion. Further, a frictional force may be applied to wheels 216 by engaging wheel brakes 218. In one example, wheel brakes 218 may be engaged in response to the driver pressing his foot on a brake pedal (not shown). In the same way, a frictional force may be reduced to wheels 216 by disengaging wheel brakes 218 in response to the driver releasing his foot from a brake pedal. Further, vehicle brakes may apply a frictional force to wheels 216 as part of an automated engine stopping procedure.

Gear clutches 230 may be selectively applied via gear actuator 233. Gear actuator 233 may be electrically or hydraulically operated. Creep may be reduced in an automatic transmission via slipping a gear clutch 230. For example, if the vehicle is stopped a gear clutch (e.g., $1^{st}$, $2^{nd}$, $3^{rd}$, or $4^{th}$ gear clutch) may be slipped to reduce creep torque.

Transmission input speed may be monitored via transmission input shaft speed sensor 240. Transmission output speed may be monitored via transmission output shaft speed sensor 244. In some examples, inclinometer 250 may provide vehicle road grade data to controller 12 so that torque converter 206 may be controlled (e.g., increase or decrease clutch apply pressure and adjust clutch engagement timing) via controller 12. In some examples, torque transmitted through transmission 208 may be determined via a torque sensor 245.

A controller 12 may be configured to receive inputs from engine 10, and accordingly control a torque output of the engine and/or operation of the torque converter, transmission, clutches, and/or brakes. As one example, a torque output may be controlled by adjusting a combination of spark timing, fuel pulse width, fuel pulse timing, and/or air charge, by controlling air inlet throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

In some examples, wheel brakes 218 may be held in an applied state after a driver releases a brake pedal and before a threshold driver demand torque is provided. By holding the state of wheel brakes 218, it may be possible to reduce the possibility of the vehicle rolling when the driver releases the brake on a hill.

FIG. 3 shows a high-level flow chart for an example method 300 for preventing wheel slippage on a stopped vehicle in accordance with the current disclosure. In particular, method 300 relates to preventing wheel slippage on a stopped vehicle before it occurs. Method 300 will be described herein with reference to the components and systems depicted in FIGS. 1 and 2, though it should be understood that the method may be applied to other systems without departing from the scope of this disclosure. Method 300 may be carried out by controller 12, and may be stored as executable instructions in non-transitory memory.

Method 300 may begin at 305. At 305, method 300 may include evaluating operating conditions. Operating conditions may include, but are not limited to, accelerator pedal position, brake pedal position, engine idle speed, brake boost vacuum, engine idle speed, front wheel speed, rear wheel speed, ignition timing, and torque output by the transmission. Method 300 may then proceed to 310.

At 310, method 300 may include determining if the accelerator pedal 130 is depressed. If the accelerator pedal 130 is pressed, then creep torque is not an issue and method 300 may proceed to 335. At 335, method 300 may include maintaining the operating conditions evaluated at 305. Method 300 may then end. Returning to 310, if the accelerator pedal 130 is not pressed, method 300 may then proceed to 315.

At 315, method 300 may include evaluating a non-driven wheel speed and comparing this speed to a threshold $v_{threshold}$. A non-driven wheel refers to a wheel of the vehicle that is not receiving torque, for example, a front wheel in a rear-wheel drive vehicle. The non-driven wheel speed threshold $v_{threshold}$ may be set to zero or may be approaching zero. If the non-driven wheel speed is greater than the threshold $v_{threshold}$, then the vehicle is in motion. Method 300 may proceed to 335. At 335, method 300 may include maintaining the operating conditions evaluated at 305. Method 300 may then end. Returning to 315, if the speed is less than or equal to the threshold $v_{threshold}$, then the vehicle is not in motion. Method 300 may then continue to 320.

At 320, method 300 may include measuring a brake boost vacuum and comparing this measurement to a vacuum threshold $V_{threshold}$. If the brake boost vacuum is greater than the threshold $V_{threshold}$, then there is sufficient brake boost vacuum to apply the brakes. Method 300 may proceed to 335. At 335, method 300 may include maintaining the operating conditions evaluated at 305. Method 300 may then end. Returning to 320, if the brake boost vacuum is less than or equal to the threshold $V_{threshold}$, then there is not sufficient brake boost vacuum to apply the brakes. A low brake boost vacuum may occur if the engine idle speed is high and the engine is in gear, or if the vehicle is at a high altitude. Method 300 may then continue to 325.

At 325, method 300 may include measuring an engine idle speed and comparing this measurement to a threshold $Sp_{threshold}$. Threshold $Sp_{threshold}$ may be predetermined such that below the threshold, the creep torque is too low to cause wheel slippage. Therefore, if the engine idle speed is less than the threshold $Sp_{threshold}$, method 300 may proceed to 335. At 335, method 300 may include maintaining the operating conditions evaluated at 305. Method 300 may then end. Otherwise, if the engine idle speed is greater than the threshold $Sp_{threshold}$, then the creep torque is high and wheel slippage may be possible. Method 300 may then continue to 330.

At 330, method 300 may include reducing torque to the driven wheels. In the preferred embodiment 326, reducing torque to the driven wheels may include upshifting the transmission. Upshifting the transmission, say from first gear to second or third gear depending on the engine idle speed, reduces the creep torque to the driven wheels, thereby reducing the likelihood of wheel slippage. The transmission may be upshifted from first gear to second gear or third gear responsive to the engine idle speed. A higher engine idle speed may correspond to a higher transmission gear. For example, if the engine idle speed is between 750 to 1000 rotations per minute (rpm), the transmission may upshift from first to second gear. If the engine idle speed is between 1000 and 1200 rpm, the transmission may upshift from first to third gear. In this way, a consistent creep torque may be provided for any engine idle speed.

In another embodiment 327, reducing torque to the driven wheels may include slipping the transmission clutch 230. Slipping the transmission clutch comprises rapidly disengaging and engaging the clutch 230 so that the transmission 208 is not fully in gear, thereby reducing the torque delivered to the wheels. Though slipping the clutch is typically undesirable, the use of this technique would be brief and infrequent so that negative effects due to friction are negligible. Slipping the transmission clutch may otherwise comprise slipping the torque converter clutch as described herein and with regard to FIG. 2.

In another embodiment 328, reducing torque to the driven wheels may include retarding ignition timing. Retarding ignition timing comprises igniting injected fuel in the combustion chamber 30 after the piston is in TDC or after a normal ignition advance with respect to TDC, resulting in less efficient combustion and therefore less torque.

The particular method in 330 of reducing torque to driven wheels implemented to prevent wheel slippage may be chosen responsive to operating conditions. Further, the operation and the amounts may be determined from barometric pressure, road grade, manifold vacuum, engine speed, clutch pressure, road friction, etc. Method 300 may then end.

The method of reducing torque to driven wheels may not be limited to the operations 330. Other techniques known to a person skilled in the arts may be used to reduce torque produced by the engine, for example, throttling air inducted into the engine, adjusting timing of a device for injecting fuel into the engine, adjusting ignition timing, adjusting valve timing, or adjusting air forced into the engine by a compressor in the case of a turbocharged or supercharged engine.

FIG. 4 shows a high-level flow chart for an example method 400 for preventing wheel slippage of a stopped vehicle in accordance with the current disclosure. In particular, method 400 relates to reducing wheel slippage of a stopped vehicle while wheel slippage is occurring. Method 400 will be described herein with reference to the components and systems of FIGS. 1 and 2, though it should be understood that the method may be applied to other systems without departing from the scope of this disclosure. Method 400 may be carried out by controller 12, and may be stored as executable instructions in non-transitory memory.

Method 400 may begin at 405. At 405, method 400 may include evaluating operating conditions. Operating conditions may include, but are not limited to, accelerator pedal position, brake pedal position, engine idle speed, brake boost vacuum, engine idle speed, front wheel speed, rear wheel speed, ignition timing, torque output by the transmission, and the magnitude of driven wheel slip. Method 400 may then proceed to 410.

At 410, method 400 may include determining if the accelerator pedal 130 is depressed. If the accelerator pedal 130 is pressed, then the vehicle is in motion and creep torque is not an issue. Method 400 may proceed to 425. At 425, method 400 may include maintaining the operating conditions evaluated at 405. Method 400 may then end. Returning to 410, if the accelerator pedal 130 is not pressed, there may be creep torque and so method 400 may continue to 415.

At 415, method 400 may include determining if the non-driven wheel speed is zero. If the non-driven wheel speed is not zero, then the vehicle is in motion and method 400 may proceed to 425. At 425, method 400 may include maintaining the operating conditions evaluated at 405. Method 400 may then end. Returning to 415, if the non-driven wheel speed is zero, then it is possible that wheel slippage may occur. Method 400 may then continue to 420.

At 420, method 400 may include measuring the driven wheel slippage and comparing this measurement to a slip threshold. This threshold may be zero or approaching zero. If the driven wheel slippage is below the slip threshold, then there is no wheel slippage and method 400 may proceed to 425. At 425, method 400 may include maintaining the operating conditions evaluated at 405. Method 400 may then end. Returning to 420, if the driven wheel slippage is above the slip threshold, then there is wheel slippage due to creep torque. Method 400 may then continue to 430.

At 430, method 400 may include reducing torque to driven wheels, applying additional brake force to driven wheels, or some combination of reducing torque to driven wheels and applying additional brake force to driven wheels. In the preferred embodiment 431, reducing torque to driven wheels includes upshifting the transmission. Upshifting the transmission, say from first gear to second or third gear depending on the engine idle speed, reduces the creep torque to the driven wheels, thereby reducing the likelihood of wheel slippage. The transmission may be upshifted from first gear to second gear or third gear responsive to the engine idle speed. A higher engine idle speed may correspond to a higher transmission gear. For example, if the engine idle speed is between 750 to 1000 rotations per minute (rpm), the transmission may upshift from first to second gear. If the engine idle speed is between 1000 and 1200 rpm, the transmission may upshift from first to third gear. In this way, a consistent creep torque may be provided for any engine idle speed.

In another embodiment 432, reducing torque to the driven wheels may include slipping the transmission clutch. Slipping the transmission clutch comprises rapidly disengaging and engaging the clutch so that the transmission is not fully in gear, thereby reducing the torque delivered to the wheels. Though slipping the clutch is typically undesirable, the use of this technique would be brief and infrequent so that negative effects due to friction are negligible. Slipping the transmission clutch may otherwise comprise slipping the torque converter clutch as described herein and with regard to FIG. 2.

In another embodiment 433, reducing torque to the driven wheels may include shifting the transmission to neutral. Shifting the transmission to neutral eliminates the transmission of torque through the powertrain to the rear wheels, thereby eliminating any creep torque.

In another embodiment 434, reducing torque to the driven wheels may include retarding ignition timing. Retarding ignition timing comprises igniting injected fuel in the combustion chamber 30 after the piston is in TDC or after a normal ignition advance with respect to TDC, resulting in less efficient combustion and therefore less torque.

Returning to 430, method 400 may also include applying additional brake force to the driven wheels. In one embodiment 435, applying additional brake force to the driven wheels may include increasing brake pressure to the driven wheels. Applying additional brake force to driven wheels may only be possible when the brake booster vacuum is above a vacuum threshold.

In another embodiment 436, applying additional brake force to the driven wheels may include applying an electric parking brake to the driven wheels. Applying an electric parking brake to the driven wheels disables the driven wheels ability to spin.

The particular operation or operations in 430 of reducing torque to driven wheels or applying additional brake force to driven wheels implemented to prevent wheel slippage may be chosen responsive to operating conditions. Further, the operation and the amounts may be determined from barometric pressure, road grade, manifold vacuum, engine speed, clutch pressure, road friction, etc.

The method of reducing torque to driven wheels may not be limited to the operations 430. Other techniques known to a person skilled in the arts may be used to reduce torque produced by the engine, for example, throttling air inducted into the engine, adjusting timing of a device for injecting fuel into the engine, adjusting ignition timing, adjusting valve timing, or adjusting air forced into the engine by a compressor in the case of a turbocharged or supercharged engine.

Method 400 may then continue to 420 in order to determine if wheel slippage still occurs. If the driven wheel slippage is still above a threshold, method 400 returns to 430. At 430, one or more of the operations is applied as disclosed herein. Method 400 may loop between 420 and 430, applying one or more operations until the driven wheel slippage is below the slip threshold. Method 400 may then proceed to 425. At 425, method 400 may include maintaining the operating conditions. The operating conditions may include the conditions evaluated at 405, and may also include the new operating conditions established at 430. Method 400 may then end.

FIG. 5 shows a high-level flow chart for an example method 500 for preventing wheel slippage of a stopped vehicle in accordance with the current disclosure. In particular, method 500 relates to giving consistent creep torque over the range of engine idle speeds. Method 500 will be described herein with reference to the components and systems depicted in FIGS. 1 and 2, though it should be understood that the method may be applied to other systems without departing from the scope of this disclosure. Method 500 may be carried out by controller 12, and may be stored as executable instructions in non-transitory memory.

Method 500 may begin at 505. At 505, method 500 may include evaluating operating conditions. Operating conditions may include, but are not limited to, accelerator pedal position, brake pedal position, engine idle speed, brake boost vacuum, engine idle speed, front wheel speed, rear wheel speed, ignition timing, and torque output by the transmission. Method 500 may then proceed to 510.

At 510, method 500 may include determining if the accelerator pedal 130 is depressed. If the accelerator pedal 130 is pressed, then the vehicle is in motion and creep torque is not a concern. Method 500 may proceed to 530. At 530, method 500 may include maintaining the operating conditions evaluated at 505. Method 500 may then end. Returning to 510, if the accelerator pedal 130 is not pressed, then it is possible that creep torque is a concern. Method 500 may then continue to 515.

At 515, method 500 may include measuring the non-driven wheel speed and comparing this measurement to a threshold $v_{threshold}$. If the non-driven wheel speed is greater than the threshold $v_{threshold}$, then the vehicle is in motion and method 500 may proceed to 530. At 530, method 500 may include maintaining the operating conditions evaluated at 505. Method 500 may then end. Returning to 515, if the non-driven wheel speed is less than or equal to the threshold $v_{threshold}$, then the vehicle is not in motion and creep torque may be a concern. Method 500 may then continue to 520.

At 520, method 500 may include measuring the engine idle speed and comparing this measurement to a threshold $Sp_{threshold}$. If the engine idle speed is less than the threshold $Sp_{threshold}$, then creep torque may not be a concern and method 500 may proceed to 530. At 530, method 500 may include maintaining the operating conditions evaluated at 505. Method 500 may then end. Returning to 520, if the engine idle speed is greater than or equal to the threshold $Sp_{threshold}$, then method 500 may continue to 525.

Continuing at 525, method 500 may include applying substantially constant torque to driven wheels by applying transmission gear related to engine idle speed. For example, if the engine idle speed is in the range 550 to 750 rotations per minute (rpm), the transmission gear will be in first gear. If the engine idle speed is in the range 750 to 1000 rpm, the transmission gear will be shifted to second gear. If the engine idle speed is in the range 1000 to 1200 rpm, the transmission gear will be shifted to third gear. In this way, the transmission provides a consistent creep torque rather than a variable torque responsive to engine idle speed. Method 500 may then end.

FIG. 6 shows an example timeline 600 for preventing wheel slippage on a stopped vehicle using the method described herein and with regards to FIG. 3. Timeline 600 includes vertical dashed lines $t_0$, $t_1$, $t_2$, $t_3$, and $t_4$ to represent times of interest during the sequence. The x-axis for all plots represents time, and time increases from the left side of FIG. 6 to the right side of FIG. 6. Timeline 600 is for illustrative purposes and therefore is not drawn to scale.

Timeline 600 includes plot 610, indicating the brake pedal position over time. Above the brake pedal position threshold 615, the brakes are applied to the non-driven wheels. Timeline 600 also includes plot 620, indicating the vehicle speed as measured by the non-driven wheels over time; plot 630, indicating the engine idle speed over time; plot 640, indicating the transmission gear over time; plot 650, indicating the creep torque over time; and plot 660, indicating the brake boost vacuum over time. Line 625 represents the vehicle speed threshold $v_{threshold}$. Line 635 represents the engine idle speed threshold $Sp_{threshold}$. Line 665 represents the brake boost vacuum threshold $V_{threshold}$.

At time $t_0$, the driver has applied the brakes to the non-driven wheels as shown by plot 610. The vehicle speed as measured by the non-driven wheels is therefore zero, as shown by plot 620. The engine idle speed is well above the threshold, as shown by plot 630. Since the transmission is in first gear, as shown by plot 640, a creep torque is present. Plot 650 shows that the creep torque is very high, which is a result of the high engine idle speed. Furthermore, the high engine idle speed yields a low brake boost vacuum, as shown by plot 660.

From time $t_1$ to $t_2$, the transmission upshifts from first gear to second gear while the brakes are still applied and the vehicle is still not in motion. As a result, the creep torque is reduced to a level consistent with a normal engine idle speed. At time $t_2$, the engine idle speed is still above threshold 635 and the brake boost vacuum is still below threshold 665. Meanwhile, the brakes are maintained on the non-driven wheels and so the vehicle speed as measured by the non-driven wheels is still zero. However, the creep torque is at a manageable level and the possibility of unintended lateral movement of the driven wheels is minimized.

FIG. 7 shows an example timeline 700 for stopping wheel slippage on a stopped vehicle using the method described herein and with regard to FIG. 4. Timeline 700 includes vertical dashed lines $t_0$, $t_1$, $t_2$, $t_3$, and $t_4$ to represent times of interest during the sequence. The x-axis for all plots represents time, and time increases from the left side of FIG. 7 to the right side of FIG. 7. Timeline 700 is for illustrative purposes and therefore is not drawn to scale.

Timeline 700 includes plot 710, indicating the brake pedal position over time. Above the brake pedal position threshold 715, the brakes are applied to the non-driven wheels. Timeline 700 also includes plot 720, indicating the vehicle speed as measured by the non-driven wheels over time; plot 730, indicating the driven wheel slippage over time; plot 740, indicating the engine idle speed over time; plot 750, indicating the transmission gear over time; plot 760, indicating the creep torque over time; and plot 770, indicating the brake boost vacuum over time. Line 725 represents the vehicle speed threshold $v_{threshold}=0$. Line 735 represents a driven wheel slip threshold. Line 745 represents an engine idle speed threshold. Line 775 represents a brake boost vacuum threshold. Time 700 also includes plot 780, indicating the clutch slippage over time. Line 785 represents a clutch slip threshold.

At time $t_0$, the driver has applied the brakes to the non-driven wheels and thus the vehicle is not moving as measured by the non-driven wheels, as shown in plots 710 and 720. However, as respectively shown in plots 740, 750, and 760, the engine idle speed is high and the transmission is in first gear, resulting in a high creep torque. Plot 770 shows that insufficient brake boost vacuum is available to the brakes, so there is a substantial amount of driven wheel slippage as depicted in plot 730. Since the driven wheel slippage is above the slip threshold, the entry conditions for the method of FIG. 4 are met at $t_0$.

From times $t_1$ to $t_2$, the transmission upshifts from first gear to second gear while the brakes are still applied and the vehicle is not in motion. The transmission upshift reduces the creep torque to the driven wheels, thereby reducing the driven wheel slippage. However, at $t_3$ the wheel slippage is still above the slip threshold 735 and must be further reduced. Since there is still insufficient brake boost vacuum available, it is possible to reduce the engine idle speed below the idle speed threshold so that brake boost vacuum may be increased. However, it may be preferable to apply another method for reducing the creep torque, such as slipping the clutch.

Prior to time $t_3$, the clutch begins to slip as shown by plot 780. From times $t_3$ to $t_4$, the clutch slippage is above a clutch slippage threshold 785 and so torque is not being transmitted to the driven wheels. At time $t_4$, the creep torque is reduced below a threshold 765 and the wheels are no longer slipping. The driven wheel slippage has been effectively reduced or eliminated.

In another representation, a method comprises applying a brake force concurrently to all four wheels of a motor vehicle to slow down said vehicle toward a non-moving condition while torque continues to be applied to each of its driven wheels, and reducing wheel slippage of said driven wheels by reducing said applied torque only after vehicle speed has fallen below a low speed threshold, which may include a non-forward-moving condition. The reducing torque of the driven wheels may include upshifting an automatic transmission coupled between an engine of said vehicle and said driven wheels. Furthermore, such operation may occur while and be responsive to engine speed is higher than a high engine idle speed threshold. Further, such operation may occur while and be responsive to a situation where the transmission's torque converter create a torque larger than a threshold nominal creep torque, thereby driving the rear wheels. Furthermore, such operation can occur during and be responsive to a condition where the engine vacuum is lower than a threshold where the engine is throttled less at the high engine speed as compared to a lower engine idle speed, and vacuum is consumed by the front end accessory drive, torque converter, catalyst heating, and cold engine friction needs. Thus such operation can be during and responsive to stored brake booster vacuum lower than a threshold, and further adjusted responsive to atmospheric pressure at high altitude lower than a threshold, triggering the and adjusting an amount of the torque applied to each of the four wheels of the vehicle. For example, increase torque may be applied at higher engine speed, lower atmospheric pressure, lower stored vacuum (e.g., higher vacuum pressure), engine throttling less than a threshold and/or combinations thereof.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
applying a brake force to all four wheels of a motor vehicle to stop said vehicle while torque continues to be applied to its driven wheels; and
preventing wheel slippage of said driven wheels by reducing said applied torque when said vehicle is stopped or nearly stopped from moving in a forward direction, wherein said reducing said applied torque is both initiated before said wheel slippage occurs and after said wheel slippage occurs.

2. The method recited in claim 1, wherein said reducing said applied torque comprises upshifting an automatic transmission coupled between an engine of said vehicle and said driven wheels.

3. The method recited in claim 2, wherein said reducing said applied torque comprises slipping a clutch of said transmission.

4. The method recited in claim 1, wherein said reducing said applied torque comprises reducing a speed of an engine of said vehicle.

5. The method recited in claim 4, wherein said engine speed is reduced by one or more of the following: throttling air inducted into said engine, retarding timing of an ignition device coupled to combustion chambers of the engine, or adjusting timing of a device for injecting fuel into said engine.

6. A method, comprising:
applying a brake force to all four wheels of a motor vehicle to stop said vehicle while torque continues to be applied to its driven wheels; and
in response to wheel slippage of said driven wheels when said vehicle is stopped from moving in a forward direction, reducing said applied torque to reduce said slippage, wherein said reducing said applied torque comprises upshifting an automatic transmission coupled between an engine of said vehicle and said driven wheels, said applying of the brake force responsive to a brake booster vacuum level and creep torque.

7. The method recited in claim 6, wherein said reducing said applied torque comprises slipping a clutch of said transmission.

8. The method recited in claim 6, wherein said reducing said applied torque comprises reducing a speed of the engine of said vehicle.

9. The method recited in claim 8, wherein said engine speed is reduced by one or more of the following: throttling air inducted into said engine, retarding timing of an ignition device coupled to combustion chambers of the engine, or adjusting timing of a device for injecting fuel into said engine.

10. The method recited in claim 6, further comprising increasing brake pressure to a braking device applied to said driven wheels in response to said wheel slippage.

11. The method recited in claim 6, further comprising applying an electric parking brake to said driven wheels in response to said wheel slippage.

12. The method recited in claim 6, further comprising a transmission gear schedule having a plurality of gears related to a range of speeds of said engine to provide a substantially constant torque applied to said driven wheels over said range of speeds of said engine.

13. A method, comprising:
applying a brake force to all four wheels of a motor vehicle to stop said vehicle while torque continues to be applied to its driven wheels; and
preventing wheel slippage of said driven wheels by reducing said applied torque when said vehicle is stopped or nearly stopped from moving in a forward direction, wherein said reducing said applied torque comprises reducing a speed of an engine of said vehicle and wherein said engine speed is reduced by one or more of the following: throttling air inducted into said engine, retarding timing of an ignition device coupled to combustion chambers of the engine, or adjusting timing of a device for injecting fuel into said engine.

14. The method of claim 13, wherein said reducing said applied torque is initiated before said wheel slippage occurs.

15. The method of claim 14, further comprising wherein said reducing said applied torque occurs when said vehicle has a brake boost vacuum that is less than a threshold vacuum.

16. The method of claim 13, wherein said preventing wheel slippage by reducing said applied torque is initiated in response to occurrence of said wheel slippage.

* * * * *